Nov. 14, 1939.　　　R. E. DUPLESSIS　　　2,180,277
MACHINE FOR USE IN MANUFACTURING BOOTS AND SHOES
Filed Oct. 4, 1935　　　7 Sheets-Sheet 1
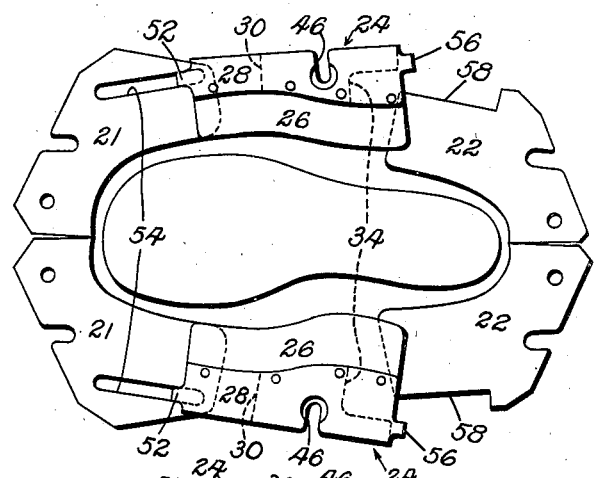
Fig.1.
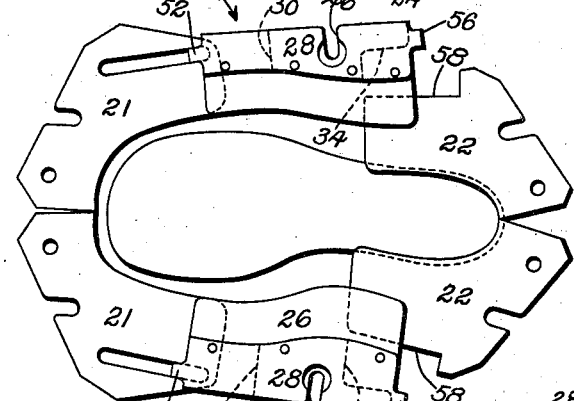
Fig.2.
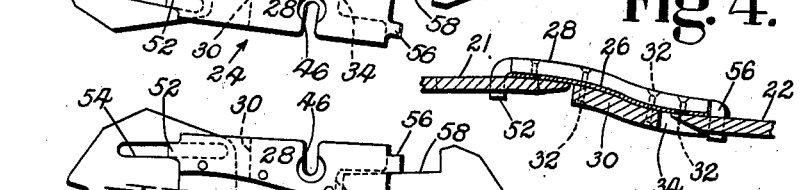
Fig.4.
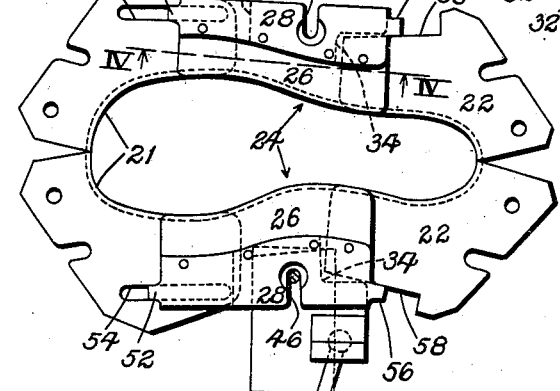
Fig.3.
INVENTOR
René E. Duplessis
By his attorney
Victor Cobb

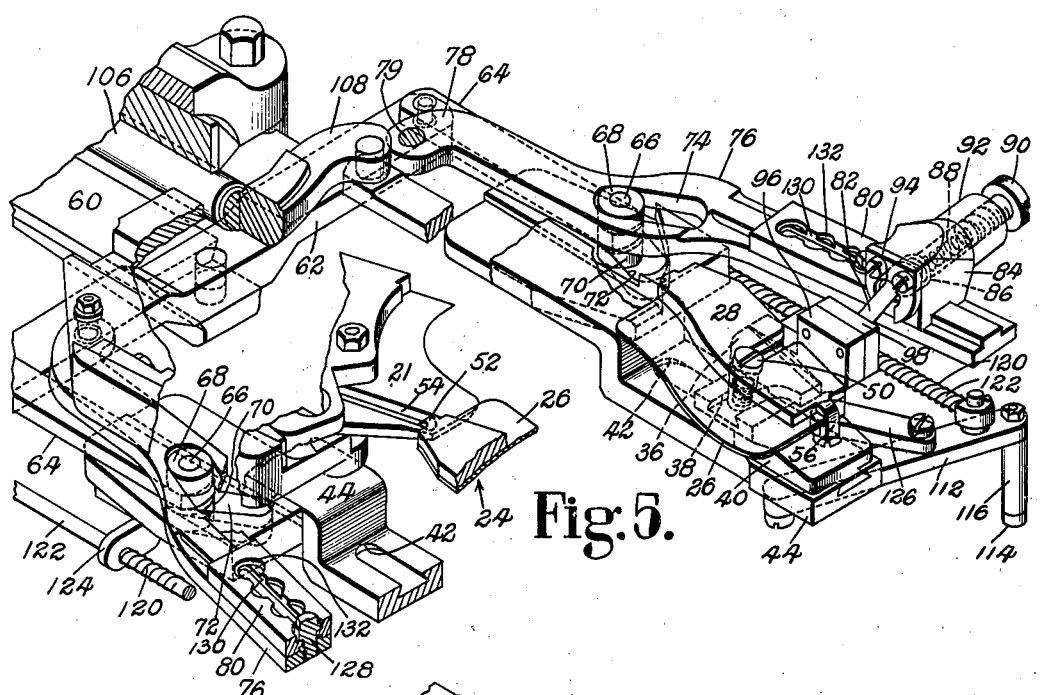
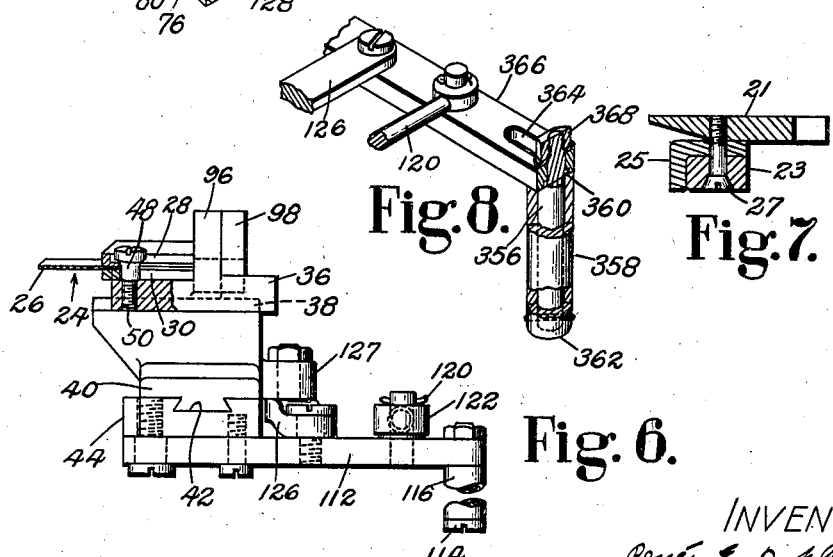

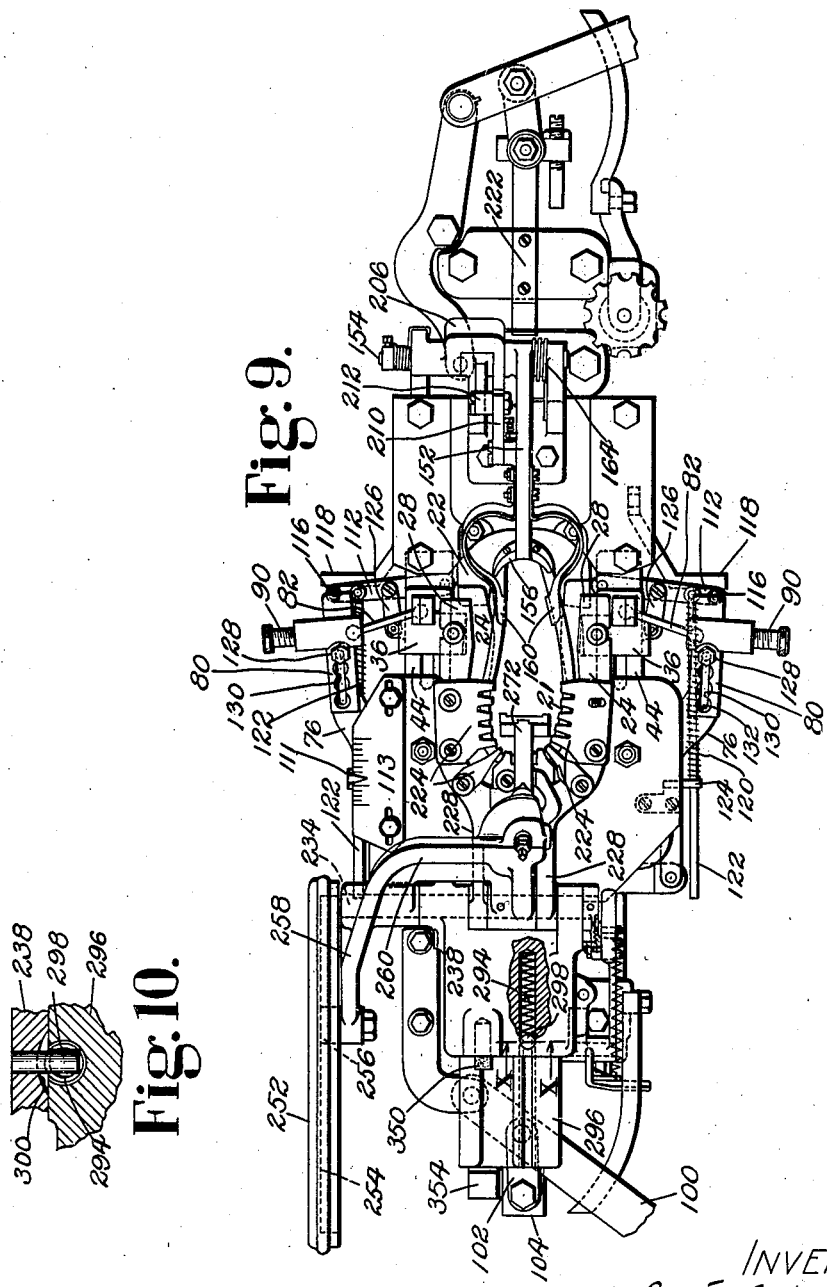

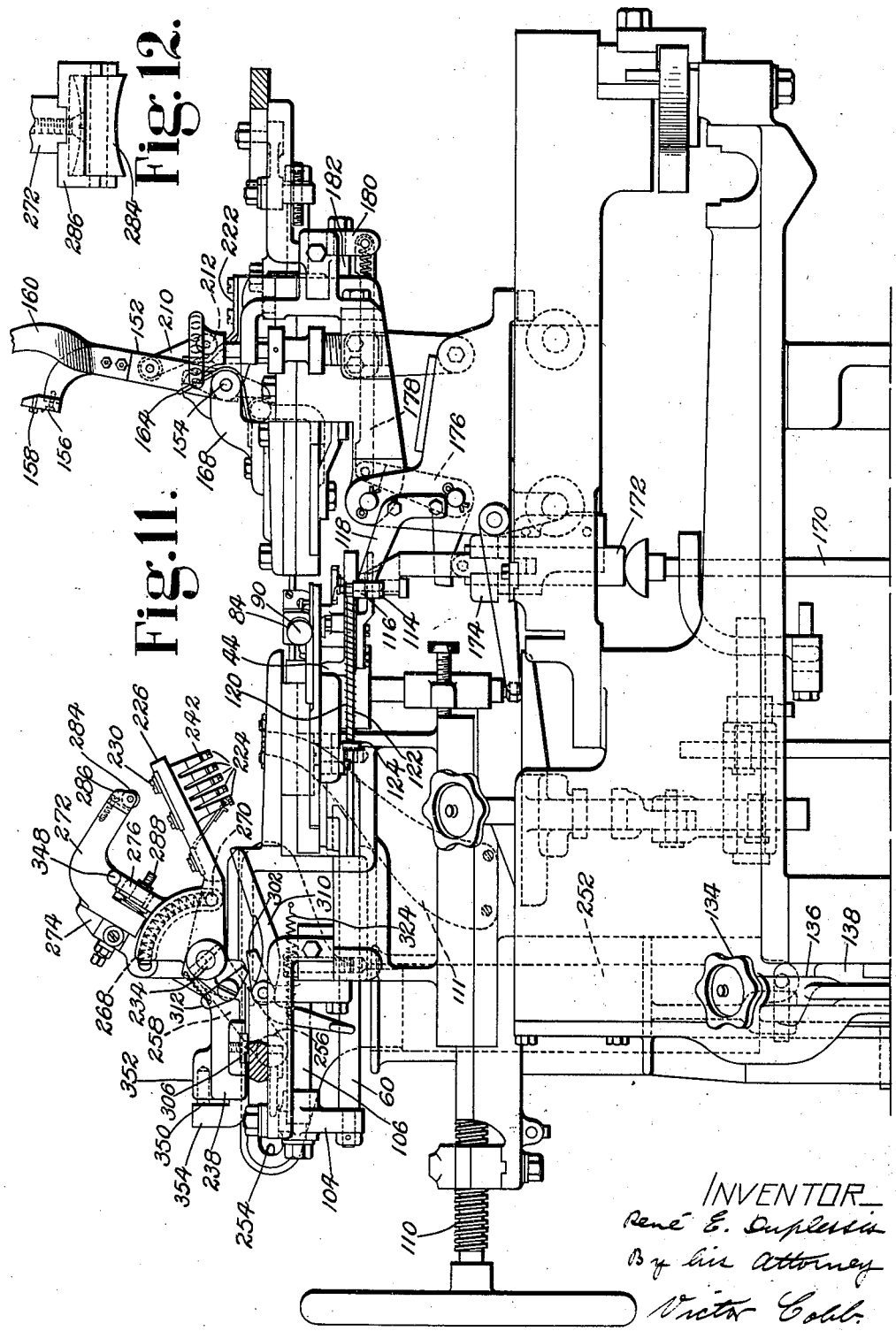

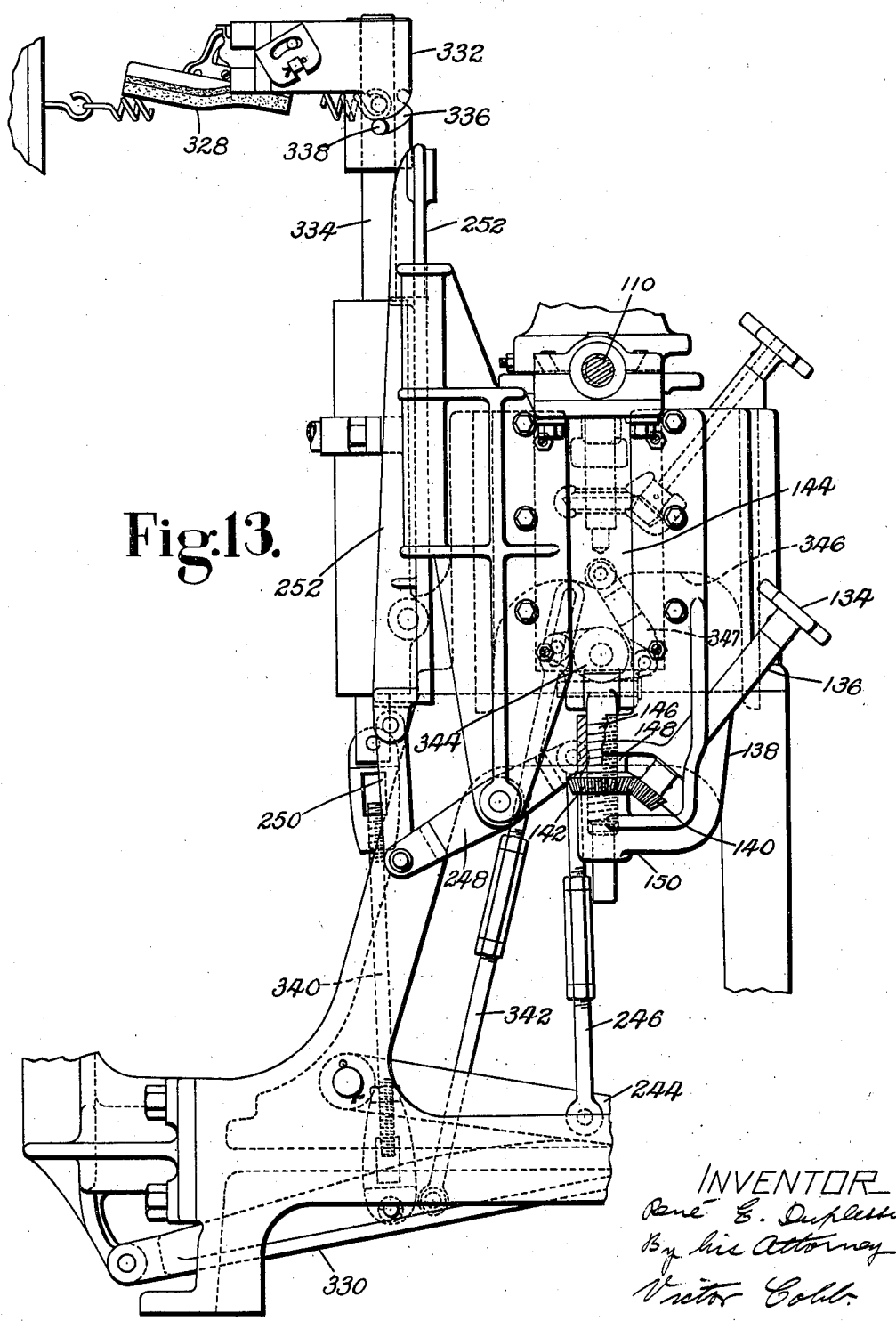

Nov. 14, 1939.   R. E. DUPLESSIS   2,180,277
MACHINE FOR USE IN MANUFACTURING BOOTS AND SHOES
Filed Oct. 4, 1935   7 Sheets-Sheet 6

INVENTOR
René E. Duplessis
By his attorney
Victor Colb

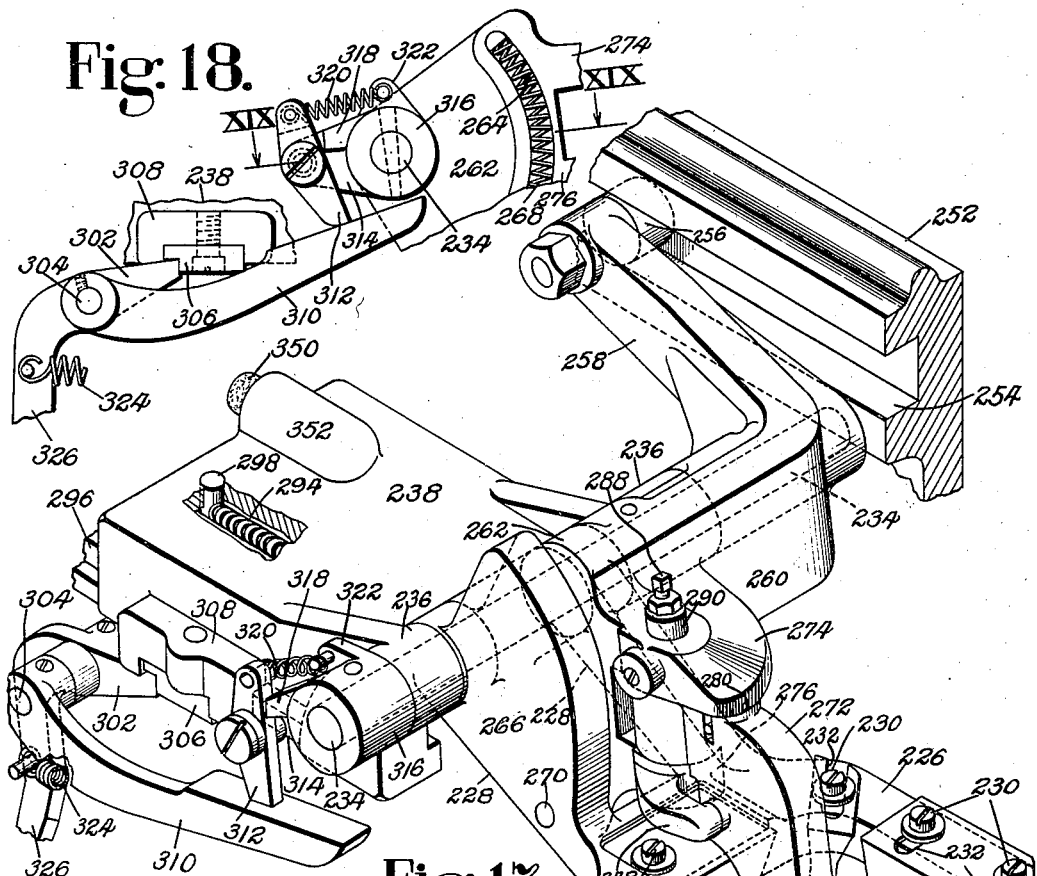
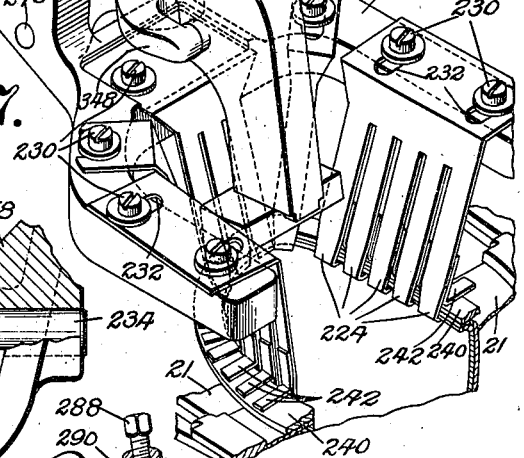
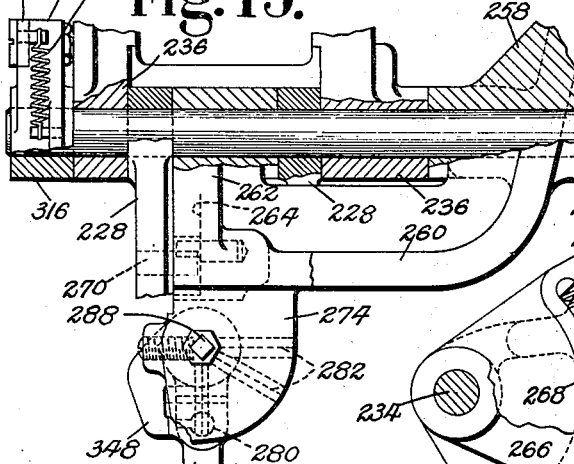
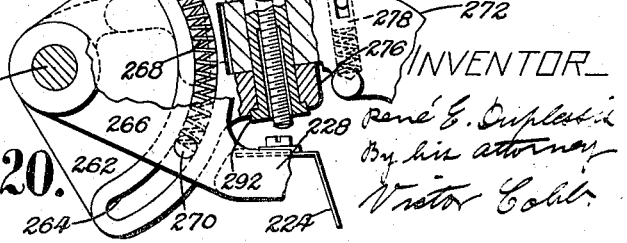

Patented Nov. 14, 1939

2,180,277

UNITED STATES PATENT OFFICE 2,180,277

MACHINE FOR USE IN MANUFACTURING BOOTS AND SHOES

René E. Duplessis, Beverly, Mass., assignor to United Shoe Machinery Corporation, Borough of Flemington, N. J., a corporation of New Jersey Application October 4, 1935, Serial No. 43,567

53 Claims. (Cl. 12—7)

The present invention relates to machines for use in manufacturing boots and shoes and is herein illustrated in its application to the manufacture of pre-welted shoes, that is shoes in the manufacture of which a welt is stitched to the upper before the upper is lasted. The invention is illustrated as embodied in a bed-lasting machine of the type disclosed in United States Letters Patent No. 1,018,447, granted February 27, 1912, on an application of Matthias S. Brock. While the invention is herein illustrated in its application to the manufacture of pre-welted shoes, it is to be understood that the invention is not limited in its scope to the manufacture of such shoes but is applicable, in certain of its aspects, to the manufacture of other types of shoes, and particularly to the manufacture of shoes in the lasting of which the overlasting margin of the upper may be turned outwardly and clamped against lasting wipers or other lasting devices and so held while a last is pressed into the upper.

Objects of the present invention are to facilitate the manufacture of shoes, particularly of pre-welted shoes, to reduce the cost of manufacture by increasing production, and more particularly to improve bed lasting machines for operating on pre-welted shoes, such, for example, as the machine illustrated in United States Letters Patent No. 2,042,518, granted June 2, 1936, on an application filed in the name of Karl Engel.

In the machine illustrated in the Engel patent above referred to there are provided toe-lasting wipers, heel-lasting wipers, and side-lasting wipers secured to the heel-lasting wipers and constructed and arranged to last the ball and shank portions of a pre-welted upper. It is now proposed to operate the side-lasting wipers independently of the heel-lasting wipers and in conjunction with the toe-lasting wipers. Accordingly, the invention in one of its aspects consists in the provision in a bed-lasting machine of a toe head having opposite side portions constructed and arranged to extend rearwardly of a shoe in the machine, toe-lasting wipers mounted in the toe head, side-lasting wipers carried by the rearward extensions of the toe head and a common actuator, for example the usual toe wiper operating lever, arranged to actuate the toe wipers and the side wipers. Preferably, the connections from the wiper actuator to the toe wipers and side wipers include yielding means arranged to permit further movement of one set of wipers after the other wipers have come to the limit of their advancement. For limiting the advancement of the rear portions of the side wipers, interengaging surfaces are formed in the side wipers and heel wipers. The engagement of these surfaces arrests the side wipers when their wiping edges have been brought into a predetermined position relatively to the wiping edges of the heel wipers, for example in a position wherein the wiping edges of the heel wipers and side wipers are in alinement with each other.

In adjusting the wipers for operating on shoes of different sizes it is desirable to adjust the relation of the side wipers and the toe wipers in order to position the side wipers in proper relation to the contour of a shoe in the machine. Accordingly, a further feature of the invention comprises means for causing relative movement of the side wipers and the toe wipers lengthwise of a shoe in the machine. As herein illustrated, such lengthwise movement is effected by movement of the toe head of the machine lengthwise of the shoe thus providing a simultaneous adjustment of the toe head and the side wipers toward and from the heel head.

In the machine of the Engel patent above referred to there is provided means for clamping the welted margin of a pre-welted upper to the wipers of the machine and a depressor for forcing a last into the clamped upper, the depressor being operated independently of the clamping means. In accordance with a further feature of the present invention the operation of the illustrated machine is facilitated by providing a common actuator for the clamping devices and the depressor. As herein illustrated, the clamping means and the depressor are initially spaced from each other in the direction of their operative movement in order to cause the clamping means to engage an upper supported on the lasting wipers while the depressor is still elevated slightly above the clamping devices, the illustrated organization permitting movement of the depressor out of the vicinity of the clamping devices in order to facilitate the introduction of a last into the clamped upper.

Like the machine of the Engel patent, the illustrated machine is provided with a sole-laying member for use in effecting cement attachment of an outsole to an upper held in lasted position by the lasting wipers of the machine, the welt being supported by the wipers in lasted position. In order to prevent interference between the sole-pressing member and the upper clamping devices it is proposed to provide an organization wherein the clamping devices are movable out of alinement with the shoe after they have been disengaged therefrom. Accordingly, a feature of the invention comprises the combination of an upper clamping member for clamping the welt of the upper against upper-supporting means, herein illustrated as the lasting wipers, and a carrier for the clamping member movable to and from a position wherein the clamping member is arranged to be brought into engagement with the welt.

In order that a relatively short actuator motion may be provided for operating one of the illustrated welt clamping devices there is provided in the illustrated machine, in accordance with a further feature of the invention, a clamp for holding the welt on its support and means for applying pressure to said clamp, said pressure-applying means being normally inoperative but being rendered operative by movement of said clamp toward its welt-engaging position. In the illustrated machine said clamp, which is the clamp that holds the heel portion of the welt against the heel wipers, is actuated by a treadle, and since the treadle has only to apply pressure to said clamping member after the member has been brought by hand into welt-engaging position, a relatively short treadle motion is sufficient to obtain the leverage required for the clamping operation.

These and other features of the invention will now be described with reference to the accompanying drawings and will be pointed out in the appended claims.

In the drawings,

Fig. 1 is a plan view of the lasting wipers of a bed lasting machine embodying my invention, the wipers being shown in their fully retracted positions;

Fig. 2 is a plan view similar to Fig. 1 showing the heel wipers advanced;

Fig. 3 is a plan view similar to Fig. 1 showing all the wipers advanced;

Fig. 4 is a detail sectional view taken substantially on the line IV—IV of Fig. 3;

Fig. 5 is a perspective view illustrating parts of the toe and the side wiper assemblies and their operating connections, certain parts being omitted to clarify the figure;

Fig. 6 is a detail elevation illustrating one of the side wiper assemblies;

Fig. 7 is a detail sectional view of one of the toe wipers illustrating particularly a wiper-arresting stop carried thereby;

Fig. 8 is a detail perspective view illustrating a modification of the side wiper assembly;

Fig. 9 is a plan view of a bed lasting machine embodying the invention;

Fig. 10 is a sectional view taken substantially on the line X—X of Fig. 9;

Fig. 11 is a front elevation of the machine illustrated in Fig. 9;

Fig. 12 is a detail view of the last-engaging roll carried by the last depressor;

Fig. 13 is an elevation looking from the left of the machine as seen in Fig. 11, the upper portion of the toe head and parts of the frame being broken away;

Fig. 17 is a perspective view of the toe-clamping assembly, the last depressor and associated parts;

Fig. 18 is a detail side elevation of a portion of the mechanism illustrated in Fig. 17;

Fig. 19 is a sectional plan view taken substantially on the line XIX—XIX of Fig. 18; and Fig. 20 is a detail elevation showing portions of the toe-clamping member and the last depressor.

Figure 14:
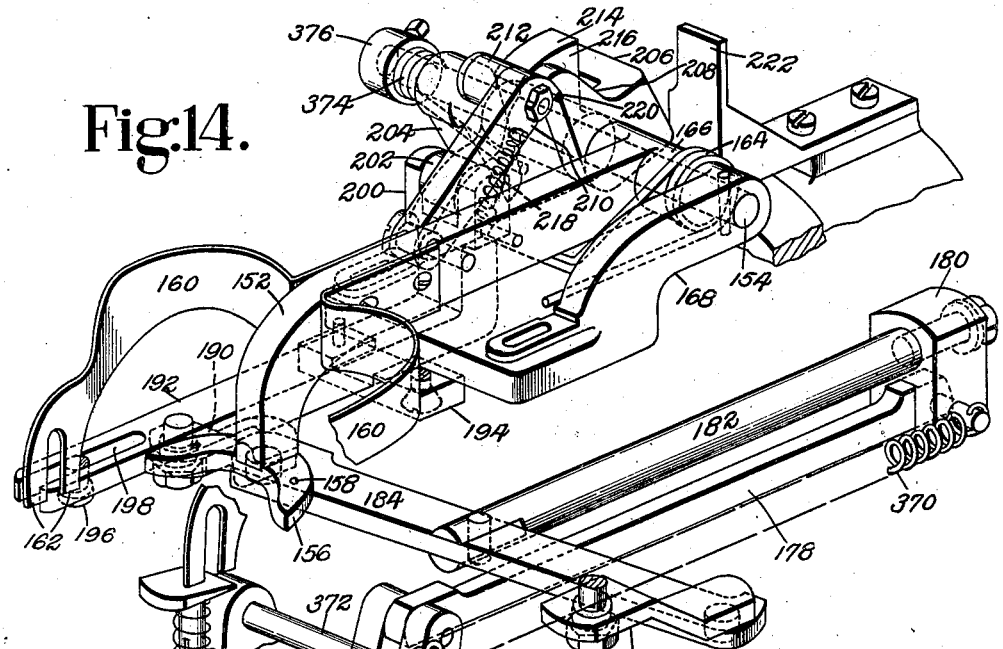
Fig. 14 is a perspective view of the heel-clamping assembly and its operating connections, most of the frame being omitted.

In common with prior machines of the illustrative type the machine illustrated in the drawings is provided with toe-lasting wipers 21 (best shown in Figs. 1, 2 and 3) and heel-lasting wipers 22, and in common with the machine illustrated in the patent to Karl Engel and above referred to the machine herein illustrated is provided with side-lasting wipers 24 the end portions of which overlie and are supported by the toe wipers and heel wipers respectively. Like the wipers of the Engel machine the wipers herein illustrated not only perform the usual lasting operation of bed lasting machine wipers but also serve to support a pre-welted upper by its welt while a last is forced into the upper through its bottom opening, and after the lasting operation has been completed the wipers remain in their advanced position and support the welt while an outsole is laid thereon and temporarily secured thereto by adhesive. The wipers engage the upper in the angle formed between the welt and the overlasting margin of the upper, the upper-engaging margins of the wipers being thin enough to permit them to engage the upper within said angle without misplacing the welt or excessively straining the welt seam.

In order to control the extent of the over-wiping movements of the lasting wipers and to arrest the wipers at the limits of their respective over-wiping movements, each of the toe wipers 21 and each of the heel wipers 22 are provided with a shoe-engaging abutment member or stop such as that illustrated in Fig. 7, the illustrated stop comprising a block 23 the shoe-engaging surface of which is faced with a soft non-abrasive material herein illustrated as a piece of felt 25 which is extended over the top of the block 23 and secured together with the block to the bottom of the wiper plate by a clamping screw 27. The extent to which the upper-engaging face of the felt 25 is set back from the wiping edge of the wiper plate determines the extent to which the wiper is permitted to advance over the margin of the last bottom. The side wipers 24 need not be provided with stops such as that illustrated in Fig. 7 since their advancement is limited by other means hereinafter described.

Referring now to Fig. 5 and particularly to the side-lasting wiper and its operating mechanism illustrated therein, the illustrated side wiper comprises a thin, flexible wiper plate 26 the wiping edge of which is shaped to conform to the contour of the ball and shank portions of the bottom of a shoe corresponding in size to the wiper, said plate being secured between an upper frame member 28 and a lower frame member 30 (Fig. 4), for example by rivets 32. The surfaces of the frame members 28 and 30 which engage the wiper plate 26 and establish the line of its wiping margin as seen in side elevation (Fig. 4) are curved to conform to the profile of the ball and shank portions of the shoe bottom. In order to permit the flexible wiper plate 26 to overlie the toe wiper 21, as illustrated in Fig. 4, during the entire lasting operation, the lower frame member 30 is so constructed and arranged that it does not underlie that portion of the wiper plate 26 which overlies the toe wiper 21 when the wipers are in their advanced positions, as illustrated in Fig. 3. Similarly, the lower frame member 30 is cut away as indicated at 34 in Fig. 3 in order to permit the wiper plate 26 to overlie the heel wiper 22 during the entire lasting operation. As illustrated in Fig. 3, the inner edge face of the upper frame member 28 is set back sufficiently from the edge of the wiper plate 26 to expose the upper marginal surface of the plate 26 for supporting the welt during the lasting and sole laying operations.

As illustrated in Figs. 5 and 6, the illustrated side wiper is pivoted to a slide 36 the upper surface of which inclines downwardly toward the heel wiper in order to position the side wiper parallel to the bottom of a last in the machine. The slide 36 moves widthwise of a shoe in the machine in a dovetail groove 38 provided in a carrier 40 which, in turn, moves lengthwise of the shoe in a dovetail groove 42 provided in a supporting arm 44 extending rearwardly of the shoe from the plate (not shown) which supports the toe wipers 21. In order to permit convenient removal of the illustrated side wiper and substitution therefor of a wiper of a different size, the illustrated wiper is removably pivoted to the slide 36 by a headed screw 50 projecting upwardly from the slide, said screw being of a type commonly used in attaching lasting wipers to their carriers. As herein illustrated the shank portion 48 (Fig 6) of the screw 50 is freely mounted in an open-ended slot 46 (Fig. 3) in the wiper extending inwardly from the outer edge face of the wiper while the round head of the screw 50 is positioned in a suitable counterbore in the region of the inner extremity of the slot 46. Thus it will be seen that the side wiper is held in position by the head of the screw 50 and the screw need only be retracted sufficiently to remove its head from the counterbore in the wiper to permit removal of the wiper from the machine and the substitution of another wiper therefor. For positioning the wiping edge of the flexible wiper plate 26 in proper alinement with the ball and shank portions of the bottom of a shoe in the machine a finger 52 extends forwardly from the end of the upper frame member 28 nearest the toe of the shoe and has its end bent downwardly for engagement within a slot 54 provided in the toe wiper 20. For arresting the overwiping movement of the side wiper plate 26 at the end of the lasting operation with the wiping edge of the side wiper substantially in alinement with the wiping edge of the heel lasting wiper 22 a finger 56 extends lengthwise of the shoe from the end of the upper frame member 28 nearest the heel portion of the shoe, the end of said finger being bent downwardly, as illustrated in Fig. 4, for engagment with an edge face 58 provided in the heel wiper 22.

For operating the side wipers 26 an actuator or slide 60 (Fig. 5) is mounted in the toe head of the machine for movement lengthwise of a shoe in the machine and has secured to one end thereof a crosshead 62 which, in turn, has a pair of links 64 pivoted one at each end thereof, the free ends of the respective links each carrying a pin 66 which projects both upwardly and downwardly from the link and has a cam roll 68 mounted on its upper end and another cam roll 70 mounted on its lower end. The lower cam rolls 70 travel in cam slots 72 provided in the plate on which the toe wipers are supported, said slots converging rearwardly of the shoe relatively to the longitudinal median line thereof. Thus it will be seen that the movement of the cam roll 70 through the slot 72 as the slide 60 travels rearwardly of the shoe causes the link 64 to swing toward the shoe about its pivotal connection with the cross bar 62. The upper cam rolls 68 carried by the respective links 64 each travel in a cam slot 74 provided in an arm 76 which has its curved end portion 78 pivoted at 79 to the top plate (not shown) of the toe head. The cam slot 74 diverges rearwardly of the shoe relatively to the longitudinal median line thereof. Thus it will be seen that the movement of the free end of the arm 76 during the advancement of the slide 60 is derived from two cooperating cam motions which effect the desired movement of the arm 76 with less friction than would result from the production of the same movement of the arm 76 by one such cam motion. For transmitting movement of the free end of each arm 76 to the slide 36 on which the side wiper is mounted, a slide 80 is mounted on the arm 76 for movement lengthwise thereof and a ball-ended link 82 is pivotally mounted in a block 84 projecting upwardly from one end of the slide 80, said block being drilled widthwise of the arm 76 for the reception of a thimble 86 having a concave end face against which the ball end of the link 82 is seated, said thimble being backed up by a spring 88 one end of which is seated therein and the other end of which is seated in a bore in a thumb screw 90 mounted in a boss 92 projecting from the block 84. To the side of the block 84 opposite the boss 92 there is secured a plate 94 for retaining the ball end of the link 82 within said block. The opposite ball end of the link 82 is seated in a suitable socket in a bracket 96 projecting upwardly from the slide 36 and is retained therein by a plate 98 secured to said bracket.

It will be understood that the construction and arrangement of that side-lasting assembly which is not illustrated in its entirety in Fig. 5 corresponds to the construction and arrangement of the side lasting assembly above described and consequently the above description will suffice for both constructions.

In the illustrated machine the toe wipers 21 and side wipers 24 are operated simultaneously by a hand lever 100 (Fig. 9) through a link 102 connecting the wiper lever to an upstanding head 104 (Fig. 11) the lower end of which is secured to the slide 60 and the upper end of which is secured to a sliding shaft 106 the forward end of which is secured to a crosshead 108 (Fig. 5) which has the usual connections to the toe-lasting wipers 20. The illustrated construction permits further advancement of the toe-lasting wipers after the side-lasting wipers have come to the limit of their over-wiping movement, the springs 88 in the blocks 84 taking up the excess motion of the arms 76 after the advancement of the heel portions of the side-lasting wipers has been arrested.

As usual in machines of the illustrative type the machine is adjusted for operating on different sizes of shoes by moving the toe head toward or from the heel head by means of a hand screw 110 (Fig. 11). An indicator 111 (Fig. 9) and a scale 113 similar to those provided in the machine of the Engel patent hereinbefore referred to measure in terms of shoe sizes the space between the toe head and the heel head. In the illustrated machine the hand screw 110 not only adjusts the toe head but also adjusts the side-wiper assemblies to operate on different sizes of shoes, the adjustive movement of the side-wiper assemblies being substantially less than the adjustive movement of the toe head. It has been found that by moving the side-lasting assemblies one half the amount of the adjustive movement of the toe head the proper position of the side-lasting wipers for the usual run of work is maintained. Referring now to Figs. 5 and 9, the illustrated means for effecting adjustive movement of the side-lasting assemblies comprises a pair of levers 112, one at each side of the machine, each of which is pivoted at one end to the corresponding arm 44, the free end of each lever having extending downwardly therefrom a headed pin 114 (Fig. 5) on which is pivotally mounted a roll 116 which engages a bracket 118 secured to the heel head and provides a fulcrum for the lever 112, said roll being held in contact with the bracket 118 (Fig. 9) by the compression of a spring 120 coiled about a rod 122 one end of which is pivoted to the lever 112 and the opposite end of which is slidably mounted in a bracket 124 secured to the toe head. The lever 112 has pivoted thereto midway between its ends one end of a link 126 the opposite end of which is pivoted to a lug 127 (Fig. 6) on the carrier 40 on which the side-wiper assembly is mounted. It will be seen that adjustment of the side-wiper assemblies lengthwise of a shoe in the machine varies the angle of the link 82 to the arm 76. It is, of course, desirable that said link be maintained at approximately a right angle to the arm 76. In the illustrated machine this condition is maintained by adjusting the slide 80 lengthwise of the arm 76 after adjusting the side wipers. In order to secure the slide 80 in adjusted position a headed screw 128 is arranged to extend through a slot 130 in the slide 80 and into a tapped hole in the arm 76, the head of the screw being seated alternatively in one of a series of counterbores 132 extending downwardly from the upper surface of the slide 80 on the line of the slot 130.

While it is believed that no adjustment of the fulcrum roll 116 lengthwise of the lever 112 is necessary for the usual run of work, if it should be desirable to provide a construction permitting a variation in the ratio of the adjustive movement of the toe head to the adjustive movement of the side-lasting assembly, the modified construction illustrated in Fig. 8 may be employed. As illustrated in Fig. 8, a pin 356 which carries a fulcrum roll 358 is provided near its upper end with a peripheral flange 360, the roll 358 being positioned between the flange 360 and a collar 362 at the lower end of the pin. The portion of the pin 356 extending upwardly from the flange 360 is positioned within a slot 364 in a lever 366 corresponding to the lever 112 illustrated in Fig. 5, the flange engaging a rabbeted portion of the lever 366 adjacent to the slot 364. The pin 356 is held against movement lengthwise of the slot 364 by a clamping nut 368 threaded to the upper end of the pin 356. It will be seen that adjustive movement of the side-lasting assembly may be increased by movement of the fulcrum roll 358 toward the link 126 or decreased by movement of said roll in the opposite direction.

In adjusting the machine to operate on a given style and size of shoe it is sometimes necessary to vary the elevation of the toe head in order to bring the wipers into alinement at the juncture of the heel wipers and side wipers and into conformity with the profile of the bottom of the shoe to be operated upon. In the illustrated machine the elevation of the toe head is varied by turning a hand wheel 134 (Fig. 13) secured to a shaft which is mounted in a cylindrical portion 136 of a bracket 138 secured to the machine frame. Secured to the lower end of said shaft is a beveled gear 140 which meshes with a larger beveled gear 142 having threaded engagement with a threaded stud or screw 146 extending downwardly from a vertical slide 144 on which the toe head is mounted, the beveled gear 142 being supported and held from movement in the direction of its axis between extensions 148 and 150 of the bracket 138 within which extensions the screw 146 is slidably mounted.

As in the machine of the Engel patent above referred to the machine illustrated in the drawings is provided with means for holding the welted margin of an upper which is supported by its welt on the lasting wipers of the machine against misplacement relatively to the wipers during the introduction and depression of a last into the supported upper. Also in common with the machine of the Engel patent the machine illustrated in the drawings has associated with the devices for securing the welted margin of the upper to the lasting wipers means for guiding the last during its depression into the upper.

Figure 16:
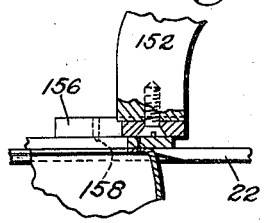
Fig. 16 is a detail elevation illustrating a portion of the heel end of a pre-welted upper clamped against one of the heel wiper plates.
Figure 15:
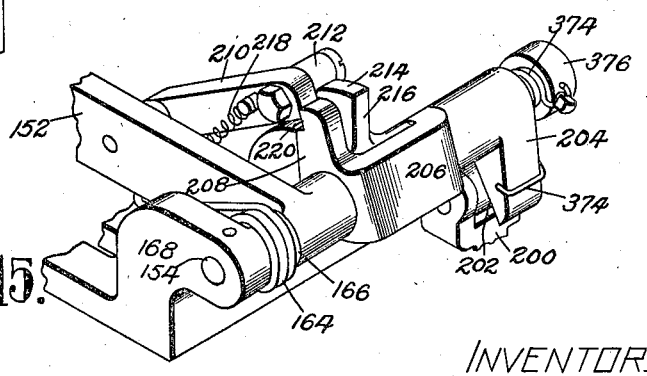
Fig. 15 is a detail perspective view of a portion of the mechanism illustrated in Fig. 14.

Referring now to Fig. 14 which illustrates means for clamping the heel portion of the welt against the heel wiper plates an arm 152 is journaled at one end thereof on a fixed cross shaft 154 and located, endwise of said shaft, substantially in the plane of the longitudinal median line of a shoe in the machine. The free end of the arm 152 is turned downwardly as seen in Fig. 14 and has secured thereto a clamping plate 156 having the general curvature of the heel portion of a shoe bottom. In order to hold the welt of an upper in the machine from sliding between the clamping plate 156 and the heel wipers while a last is pressed into the upper, the clamping plate 156 is provided with downwardly extending points or claws 158 (Fig. 16) which engage the welt and hold it in position on the heel wiper plates while the last is positioned in the upper. In order to facilitate the introduction of a last into the heel portion of the upper, spreader members herein illustrated as resilient plates 160 are secured to opposite sides of the arm 152, said plates extending outwardly from the arm 152, then forwardly of the supported shoe and downwardly into position to engage the interior of the welted margin of the upper, the end of each of said plates being provided with a pair of upper-engaging fingers 162. The free ends of the plates 160 are normally spaced from each other to such an extent that the operator is required to move them toward each other in order to cause them to enter the interior of the upper during the movement of the arm 152 into clamping position. After the fingers 162 have been positioned within the upper the operator releases his hold in the plates 160 whereupon they spring outwardly and press the opposite sides of the shank portion of the upper away from each other, thus providing an opening in the upper for the reception of the last. The arm 152 is normally held in its retracted position, as seen in Fig. 11, by a torsion spring 164 coiled about a boss 166 on an arm 168 which supports one end of the cross shaft 154, one end of said spring being extended forwardly of the shoe for engagement with the top plate of the heel head while the opposite end is extended in the same direction and bent to engage the bottom face of the arm 152. The operator swings the arm 152 by hand from its position in Fig. 11 to its work-engaging position illustrated in Fig. 14 whereupon a treadle (not shown) is depressed to apply clamping pressure to the clamping plate 156, the connections from the treadle to the arm 152 being inoperative while the arm is in its retracted position. As illustrated in Figs. 11 and 14 the connections from the treadle to the arm 152 comprise a vertical shaft 170 which is moved upwardly by the depression of the treadle thereby lifting a slide 172 mounted in a heel post 174 (Fig. 14) and imparting clockwise movement to a bell crank lever 176. The bell crank lever has pivoted to the end of its vertical arm one end of a link 178 the opposite end of which is pivoted to the lower portion of an upstanding head 180, the upper portion of said head being secured to one end of a shaft 182 which is mounted for sliding movement in a portion of the heel head which is not shown in Fig. 14. Pivotally mounted in a slot provided in the free end of the shaft 182 is a cross bar 184 one end of which is connected by a link 186 to a fixed pivot stud 188, the opposite end of said cross bar being connected by a link 190 to a slide 192 which is mounted between a portion of the heel head which is not illustrated and a grooved plate 194 secured thereto, the horizontal end of said slide being guided by a pin 196 positioned within a slot 198 in the slide and secured to the heel head. The upwardly bent end portion 200 of the slide 192 carries a roll 202, said roll being arranged to engage a downwardly extending arm 204 of a member or yoke 206 (Fig. 15) journaled on the cross shaft 154, the opposite end of said yoke 206 having an upward extension 208 which engages the free end of a link 210, one end of which is pivoted to the arm 152 midway between its ends. The free end of the link 210 carries a roll 212 which rides on a cam face 214 provided in an upward extension 216 of the top plate of the heel head, said extension serving also as one of the supports for the cross shaft 154 and as a means for preventing movement of the yoke 206 endwise of the cross shaft 154. The cam face 214 inclines upwardly sufficiently to cause the free end of the link 210 to be lifted clear of the arm 208 during the movement of the arm 152 from its position in Fig. 14 to its retracted position illustrated in Fig. 11. The link 210 is urged downwardly by a spring 218 one end of which is connected to the link near its free end and the opposite end of which is connected to the arm 152. In the position of the parts illustrated in Fig. 14 the spring 218 operates to hold the link against a shoulder 220 provided in the upstanding arm 208. During the movement of the arm 152 from its position in Fig. 11 to its position in Fig. 14 the spring 218 swings the link 210 from the elevated position into which it is carried by the cam roll 212 into position to be engaged by the arm 208. For arresting the retractive movement of the arm 152 by the spring 164 a bracket 222 is secured to the heel head and arranged with its vertical portion in position to be engaged by the arm 152 in its position illustrated in Fig. 11. The slide 192 which operates the arm 152 is held at the limit of its movement forwardly of a shoe in the machine when the machine is at rest by a spring 370, one end of which is connected to the head 180 and the opposite end of which is connected to a cross bar 372 supported between the upper ends of the heel head. During such forward movement of the slide 192 the yoke 206 is returned to its initial position by a torsion spring 374 coiled about the fixed shaft 154 and having one of its ends mounted in a collar 376 secured to said shaft while its opposite end, as illustrated in Fig. 15, is extended downwardly and bent about the downwardly extending arm 204 of the yoke 206. The spring 374 maintains constant engagement of the arm 204 with the roll 202 carried by the slide 192. It will be seen that in the illustrated construction the treadle motion is employed for the sole purpose of effecting clamping pressure of the clamping plate 156 against the heel portion of the welt of an upper in the machine, the arm 152 being swung by hand into operative position as above described, and consequently only a relatively small extent of movement is required of the treadle-operated mechanism and therefore a substantial leverage may be obtained from a relatively short treadle motion.

For clamping the toe portion of the welt of an upper in the machine against the toe-lasting wiper plates there is provided a series of fingers 224 (Fig. 17) arranged to form the general periphery of the bottom of the shoe at its toe end, said fingers, as herein illustrated, comprising a finger unit at each side of the toe portion of the upper provided with five fingers, a finger unit at the end of the toe portion of the upper having three fingers and individual fingers positioned in the space at either side of the last-mentioned unit. The upper ends of the finger units are bent to engage the upper face of a yoke 226 carried by two parallel finger supporting arms 228, said fingers being adjustably secured to the yoke by clamping screws 230 which pass through open-ended slots 232 provided in the downwardly bent portions of the fingers. The end of each arm 228 opposite the yoke 226 is journaled on a cross shaft 234 mounted in bearings 236 projecting upwardly from a carrier 238 mounted on the toe head for sliding movement lengthwise of the shoe. Mounted on the fingers 224 near their lower ends and extending outwardly therefrom over the welt 240 are presser feet 242 which engage the outsole-attaching face of the welt and flatten the welt against the toe-lasting wiper plates and also serve to determine the operative position of the fingers 224 heightwise of the shoe. For swinging the finger assembly into its operative position, as seen in Fig. 17, a treadle 244 (Fig. 13) is connected by a link 246 to one end of a rocker 248 the opposite end of which is pivoted to the lower end of a link 250, the upper end of which is pivoted to a vertical slide 252 mounted in a guideway in the machine frame. At its upper end the slide 252 is widened, as illustrated in Fig. 11, and provided with a horizontal groove 254 extending lengthwise of a shoe in the machine and arranged to receive a roll 256 pivoted to the free end of an arm 258 secured to the cross shaft 234 and connected by a bridge 260 to a segment 262 which is also mounted on the cross shaft 234, said segment being positioned adjacent to a similar segment 266 formed in one of the arms 228, which carries the finger assembly, and operatively connected thereto by a spring 268 mounted in an arcuate groove 264 (Fig. 20) in the segment 262, the axis of curvature of said groove being concentric to the cross shaft 234, said spring being retained within its groove by the interengagement of said segments. The spring 268 presses against a pin 270 mounted in the segment 266 and arranged to project into the arcuate groove 264 in which the spring is mounted.

For forcing the forepart of a last into an upper supported on the wiper plates and clamped thereon by the clamping devices above described, a depressor, herein illustrated as an arm 272 (Figs. 9, 11 and 17) is swiveled between projections 274 and 276 on the segment 262 (Fig. 20) and is held in alinement with a last arranged to be depressed into the supported upper by the engagement of a spring-pressed pin 278 mounted in the depressor arm 272 within a groove 280 in the under surface of the projection 274. To facilitate the introduction of the last into the supported upper the depressor arm may be swung out of its position, as illustrated in Fig. 17, into either of two inoperative positions, the depressor arm being held in either of these positions by the engagement of the spring-pressed pin 278 within one or the other of the grooves 282 illustrated in Fig. 19. In order to reduce to a minimum the friction of the depressor on the last bottom the free end of the depressor carries a roll 284 (Fig. 12) pivotally mounted between the downwardly extending arms of a yoke 286 secured to the end face of the depressor arm 272 and arranged to extend transversely of the supported shoe, the yoke being held in said position by a tongue and groove connection with the end of the depressor arm. The diameter of the roll 284 decreases from the end faces of the roll toward the center, the curvature of the work-engaging face of the roll being substantially the same as the widthwise curvature of the forepart of the last. Referring now to Fig. 11, it will be seen that the spring 268 mounted in the segment 262 yieldingly holds the depressor arm 272 above the yoke 226 and that operative movement of the slide 252 swings the upper-engaging fingers into their operative positions while permitting the depressor arm to remain in a position in which it may be swung to or from a position of alinement with the finger assembly without interference by the yoke 226. The extent to which the depressor forces the last into the supported upper is determined by a stop screw 288 (Fig. 20) extending through the projections 274 and 276 on the segment 262 for engagement with the yoke 226 which carries the finger assembly. As herein illustrated, the stop screw extends through and has threaded engagement within a sleeve 290 on which the depressor arm is pivotally mounted, said sleeve being held from upward movement through said projections by a flange 292 which is formed in the lower end of said sleeve and seated in a counterbore in the projection 276.

After the last has been pressed into the supported upper the toe-lasting wipers are advanced sufficiently to retain the forepart of the last within the forepart of the upper whereupon the operator releases the treadle 244 and permits it to be returned by a treadle spring (not shown) to its initial position, the return of the treadle operating to lower the slide 252 and to return the depressor 272 and the yoke 226 carrying the finger assembly to their respective retracted positions. The return of the depressor to its retracted position releases a latch hereinafter described which holds the slide 238 on which the depressor is mounted in its position illustrated in Fig. 17 and permits the return of the slide to its position illustrated in Fig. 11, in which position the depressor 272 and the finger assembly are sufficiently removed from the supported shoe to obviate interference thereof with the sole-laying operation. The illustrated means for returning the slide 238 to its position in Fig. 11 comprises a compression spring 294 (Figs. 9 and 10) positioned in a drilled groove in the top plate 296 of the toe head. The width of said groove at the surface of the top plate being less than the diameter of the spring (Fig. 10), it will be seen that the spring is retained within the groove and thus held from engagement with the slide. The end of the spring 294 nearest to the supported shoe is seated at the end of said groove while the opposite end of the spring presses against a pin 298 extending downwardly into said groove from the slide 238. As illustrated in Fig. 10, the under surface of the slide 238 is provided with a shallow groove 300 extending along the line of the spring 294 to provide clearance therefor. In order to hold the slide in its advanced position illustrated in Fig. 17, a latch member 302 is secured to a cross shaft 304 journaled in the top plate 296 of the toe head. The latch member 302 is arranged to engage a latch plate 306 mounted in a recess in the under surface of a lateral extension 308 of the slide 238. For effecting engagement of the latch member 302 with the plate 306 a spring 324 (Fig. 11) is secured to an arm 326 extending downwardly from the cross shaft 304, the opposite end of said spring being secured to a pin extending laterally from the toe head. The arm 326 also provides a handle whereby the latch member 302 may be disengaged from the plate 306 at the will of the operator.

In order that the slide 238 and the parts mounted thereon may return to their position illustrated in Fig. 11 without any special attention on the part of the operator connections are provided between the cross shaft 234 which carries the depressor 272 and the cross shaft 304 carrying the latch member 302 for disengaging the latch member from the latch plate during the return of the depressor and the finger assembly to their inoperative positions. As illustrated in Figs. 17 and 18, these connections comprise a horizontal arm 310 secured to the cross shaft 304, the free end of said arm extending beneath the cross shaft 234. For imparting downward movement to the free end of the arm 310 a dog 312 is pivoted, midway between its ends, to the end of an arm 314 extending in the direction of the cross shaft 304 from a collar 316 secured to that end of the cross shaft 234 which overlies the free end of the arm 310. When the finger assembly and the depressor are in their respective operating positions the dog 312 is held in engagement with a shoulder or stop 318 formed in the collar 316 by a spring 320 connecting the upper end of the dog 312 to an upward extension 322 of the collar 316. During the movement of the depressor 272 and the finger assembly from their positions in Fig. 17 to their positions illustrated in Fig. 11 the cross shaft 234 turns in a counterclockwise direction, as seen in Fig. 18, thereby imparting downward movement to the free end of the arm 310, thus disengaging the latch member 302 from the latch plate 306 and permitting the return of the slide 238 to its position in Fig. 11 by the compression of the spring 294. During the latter part of the movement of the depressor and finger assembly from their positions in Fig. 17 to their positions in Fig. 11 the dog 312 is swung out of engagement with the arm 310, thus permitting the latch member 302 to engage the latch plate 306 when the slide 238 is again advanced. During the movement of the finger assembly and the depressor from their positions in Fig. 11 to their positions in Fig. 17 the lower end of the dog 312 slides along the top face of the free end of the arm 312 without imparting downward movement to the said arm, said dog turning in a counter-clockwise direction, as seen in Fig. 11, as it slides along the arm 310. During the latter part of the downward movement of the depressor 272 the arm 314 swings upwardly while the dog 312 is turned in a clockwise direction, as seen in Fig. 18, by its spring 320 as the distance between the free end of the arm 310 and the pivotal connection of the dog with the arm 314 increases. At the end of the downward movement of the depressor the lower end of the dog 312 has disengaged the arm 310 and the spring 320 has brought the dog 312 into engagement with the shoulder 318 provided on the collar 316. In this position the dog 312 is arranged to impart downward movement to the free end of the arm 310 during the return of the depressor and the finger assembly to their initial positions.

After the last has been depressed into the supported upper and the toe-lasting wipers 21 have been advanced sufficiently to retain the last within the forepart of the upper, the heel clamp 156 and the finger assembly 224 and depressor 272 are returned to their respective inoperative positions illustrated in Fig. 11 and the lasting wipers are advanced to lay the welted margin of the supported upper over the margin of the last bottom, or of an insole mounted thereon, and are held in advanced position while an outsole which has been treated with adhesive is secured to the shoe bottom.

For effecting adhesion of the outsole to the shoe bottom a presser member, such, for example, as the rubber-faced presser plate 328 illustrated in Fig. 13, is operated by a treadle 330 to press the outsole uniformly against the shoe bottom. The presser plate 328 and its supporting and operating parts, which may be substantially the same as in the Engel patent hereinbefore referred to, comprise a horizontal presser arm to the free end of which the presser plate is fulcrumed, said arm being slidably mounted in a carrier herein illustrated as a swinging bracket 332 the hub of which is sleeved on a vertically movable post 334. As in the machine of the Engel patent the hub of the bracket 332 is provided with a spiral slot 336 which takes a stud 338 extending outwardly from the post 334, said stud operating to move the bracket 332 downwardly while the presser plate 328 is swung inwardly over the shoe bottom thereby positioning the presser close to the surface of the outsole. The treadle 330 is connected to the post 334 by a link 340 the length of which may be varied in order to vary the initial elevation of the bracket 332.

In order to prevent any considerable movement of the forepart of the shoe downwardly relatively to the wiper plates under the pressure of the sole-laying member, means is provided for positively moving the toe post upwardly during the depression of the sole-laying member 328. The upward movement of the toe post in the illustrated construction is effected by the depression of the treadle 330 which operates the sole-laying member, the connections from the treadle to the toe post comprising an extensible link 342 the upper end of which has a pin and slot connection with one end of a rocker 344 pivoted to the machine frame beneath a slide 346 which carries the toe-supporting assembly, a link 347 connecting the rocker to the slide. The pin and slot connection between the link 342 and the rocker arm 344 provides a lost motion of the link relatively to the rocker arm which times the upward pressure against the shoe to take effect after the sole-laying presser 328 has engaged the shoe bottom. The illustrated means for lifting the toe post is substantially the same as that disclosed in the Engel application hereinbefore referred to.

The shoemaking operations performed in the use of the illustrated machine in the manufacture of pre-welted shoes comprise the assembling of the last and upper, stretching the forepart of the upper over the last, lasting the welted margin of the upper over the margin of the last bottom, or of an insole thereon, and adhesively attaching an outsole to the bottom of the lasted shoe.

While the operation of the machine has been described in connection with the foregoing description of the machine organization, a more detailed description of the operation may serve to promote a better understanding of the invention.

When the machine is at rest the upper clamping devices are in their respective positions illustrated in Fig. 11 and the lasting wipers are in their respective positions illustrated in Fig. 1. A pre-welted upper is arranged in inverted position and positioned in the space enclosed by the wiping edges of the lasting wipers, the back seam of the upper being positioned in alinement with the point where the heel wipers engage each other. The operator then swings the arm 152, which carries the heel-clamping plate, into engagement with the heel portion of the welt of the upper in the machine and he then depresses the treadle which lifts the vertical shaft 170 (Fig. 11) thereby imparting clamping pressure to the plate 156. A treadle latch (not shown) operates to hold the plate 156 in clamping engagement with the welt. The operator now grasps the slide 238, which carries the finger assembly, and moves it in the direction of the supported upper until the latch member 302 engages the shoulder in the latch plate 306 thereby positioning the finger assembly in alinement with the toe portion of the supported upper. The operator now depresses the treadle 244 thereby imparting upward movement to the slide 252 and downward movement to the parallel arms 228 which carry the finger assembly, the depression of the treadle being arrested after the presser feet 242 of the fingers 224 have engaged the welt at the toe end of the upper in the machine and before the depressor 272 has begun to move downwardly relatively to the finger assembly. If desired, a treadle latch (not shown) may be employed to hold the treadle 244 against return movement from this intermediate position. A suitable last is now arranged in inverted position and moved downwardly and rearwardly through the opening defined by the welted margin of the upper in the machine to position the heel portion of the last within the heel portion of the upper, the toe portion of the last being permitted to rest on the shank portions of the fingers 224. As in the machine of the Engel application, above referred to, the finger unit located on the longitudinal median line of the upper in the machine is inclined rearwardly of the upper, as illustrated in Fig. 11, in order to cause the last to move rearwardly thereof during the depression of its forepart into the upper thereby to stretch the upper lengthwise thereof sufficiently to receive the last. After the last has been positioned with its heel end in the heel portion of the upper and with its toe end supported on the fingers 224 the depressor 272 is swung into alinement with the last, a stop or bracket 348 on the projection 276 (Fig. 17) of the segment 262 serving to arrest the swinging movement of the depressor arm when the arm has been brought into a position of alinement with the last. The operator now further depresses the treadle 244 in order to bring the depressor 272 into engagement with the last and to force the last into the supported upper, the extent of the depression of the last into the upper being determined by the engagement of the stop screw 288 with the yoke 226 which carries the finger assembly. The toe-lasting wipers are now advanced sufficiently beyond the edge of the last bottom to hold the last against return movement, whereupon the treadle 244 is permitted to return to its initial position thereby returning the depressor and the finger assembly to their elevated positions and disengaging the latch member 302 from the plate 306 thereby permitting the return of the slide 238 to its initial position by the spring 294, the return movement of the slide 238 being arrested by the engagement of a resilient stop herein illustrated as a rubber stud 350 (Fig. 11) carried by a boss 352 extending upwardly from the slide 238 with an abutment member 354 extending upwardly from the toe head. The heel wipers are now advanced from their positions in Fig. 1 to their positions illustrated in Fig. 2, whereupon the wiper-operating lever 100 is operated to advance the toe wipers and the side wipers simultaneously from their positions illustrated in Fig. 2 to their completely closed positions illustrated in Fig. 3. An outsole which has been treated with adhesive is now positioned on the bottom of the lasted shoe and the presser plate 328 is actuated to press the outsole against the shoe bottom. After the adhesive has set the presser plate is returned to its initial position and the lasting wipers are returned to their respective positions illustrated in Fig. 1, whereupon the operator lifts the shoe from the machine.

Having thus described my invention, what I claim as new and desire to secure by Letters Patent of the United States is:

1. In a bed lasting machine, a toe head having opposite side portions constructed and arranged to extend rearwardly of a shoe in the machine, toe-lasting wipers mounted in the toe head, side-lasting wipers carried by the rearward extensions of the toe head, and a common actuator for the toe wipers and the side wipers.

2. In a bed lasting machine, a toe head having opposite side portions constructed and arranged to extend rearwardly of a shoe in the machine beyond the shank portion of the shoe, toe-lasting wipers mounted in the toe head, side-lasting wipers carried by the rearward extensions of the toe head, and a common actuator for the toe wipers and the side wipers, the connections from the actuator to the wipers including yielding means constructed and arranged to permit further movement of one set of wipers after the other set of wipers has come to the limit of its advancement.

3. In a bed lasting machine, toe-lasting wipers, side-lasting wipers, heel lasting wipers, and connections between the toe wipers and the side wipers for controlling movements of the side wipers widthwise of a shoe in the machine, widthwise movement of the side wipers toward each other being limited by engagement of said wipers with the heel wipers.

4. In a bed lasting machine, a toe-lasting wiper, a side-lasting wiper, a wiper-operating lever, connections between the lever and the toe wiper, connections between the lever and the side wiper, and guiding connections between the toe wiper and the side wiper for controlling movement of the side wiper widthwise of a shoe in the machine.

5. In a bed lasting machine, a toe-lasting wiper, a side-lasting wiper constructed and arranged to overlap the toe wiper, a wiper-operating slide, connections from the slide to the toe wiper, connections from the slide to the side wiper including means for causing the operating movement of the slide to be applied to the side wiper in a direction substantially widthwise of a shoe in the machine, a heel wiper, and inter-engaging surfaces formed in the heel wiper and the side wiper for arresting the advancement of the side wiper by said slide.

6. In a bed lasting machine, a head, an end lasting wiper mounted therein, a side lasting wiper carried by the head, a wiper actuating slide constructed and arranged for movement lengthwise of a shoe in the machine, connections from the slide to the end wiper, and connections from the slide to the side wiper including means for causing the operating movement of the slide to be applied to the side wiper in a direction substantially widthwise of a shoe in the machine.

7. In a bed lasting machine, a toe head, a toe-lasting wiper mounted therein, a side-lasting wiper carried by the toe head, a wiper-actuating slide constructed and arranged for movement lengthwise of a shoe in the machine, connections from the slide to the toe wiper, and connections from the slide to the side wiper including means for causing the operating movement of the slide to be applied to the side wiper in a direction substantially widthwise of a shoe in the machine.

8. In a bed lasting machine, the combination with toe-lasting wipers each of which has operative movement both lengthwise and widthwise of a shoe in the machine, of side-lasting wipers which have operative movement widthwise only of the shoe, and common actuating means for said toe wipers and side wipers, said side wipers having pivotal connections to the toe wipers constructed and arranged to permit relative movement of the toe wipers and the side wipers lengthwise of the shoe.

9. In a bed lasting machine the combination with toe-lasting wipers each of which has operative movement both lengthwise and widthwise of a shoe in the machine, of sidelasting wipers having operative movement widthwise only of the shoe, and common actuating means for said toe wipers and side wipers, said side wipers being arranged to overlie the toe wipers and having pivotal connections thereto constructed and arranged to permit relative movement of the toe wipers and side wipers lengthwise of the shoe.

10. In a bed lasting machine, the combination with toe-lasting wipers and heel-lasting wipers, of side-lasting wipers which have operative movement widthwise only of the shoe, the ends of said side-lasting wipers being supported by the heel wipers and toe wipers respectively.

11. In a bed lasting machine the combination with toe-lasting wipers and heel-lasting wipers, of side-lasting wipers having operative movement widthwise only of the shoe, the ends of said side-lasting wipers overlying and being supported by the heel wipers and toe wipers respectively.

12. In a bed lasting machine, the combination with toe-lasting wipers and heel-lasting wipers which have operative movement both lengthwise and widthwise of a shoe in the machine, of side-lasting wipers which have operative movement widthwise only of the shoe, the ends of said side-lasting wipers being supported by the heel wipers and toe wipers respectively, an actuating slide for the toe wipers constructed and arranged for movement lengthwise of the shoe, and operating connections from said slide to the side wipers.

13. In a bed lasting machine the combination with toe-lasting wipers and heel-lasting wipers both of which have operative movements both lengthwise and widthwise of a shoe in the machine, of side-lasting wipers having operative movement widthwise only of the shoe, the ends of said side wipers overlying and being supported by the heel wipers and toe wipers respectively, an actuating slide for the toe wipers constructed and arranged for rectilinear movement lengthwise of the shoe, and operating connections from said slide to the side wipers.

14. In a bed lasting machine, an end-lasting wiper, a side-lasting wiper constructed and arranged to operate on the ball and shank portions of a shoe, and means carried by one of said wipers for arresting the advancement of the side wiper.

15. In a bed lasting machine, an end-lasting wiper, a side-lasting wiper constructed and arranged to operate on the ball and shank portions of a shoe, said side-lasting wiper being supported by the end-lasting wiper, and means carried by one of said wipers for arresting the advancement of the side wiper.

16. In a bed lasting machine, an end-lasting wiper, a side-lasting wiper constructed and arranged to operate on the ball and shank portions of a shoe and arranged to overlie the end-lasting wiper, and means carried by one of said wipers for arresting the advancement of the side wiper.

17. In a bed lasting machine, a heel-lasting wiper, a side-lasting wiper constructed and arranged to overlie the heel-lasting wiper, and means carried by one of said wipers for arresting the advancement of the side wiper when its wiping edge has been brought into a predetermined position relatively to the wiping edge of the heel wiper.

18. In a bed lasting machine, a toe-lasting wiper, a heel-lasting wiper, a side-lasting wiper constructed and arranged to overlie both of the end-lasting wipers and to be supported thereby, and means for arresting the advancement of the side wiper relatively to the heel wiper with the wiping edges of said wipers in alinement with each other.

19. In a bed lasting machine, a toe-lasting wiper, a heel-lasting wiper, a side-lasting wiper constructed and arranged to overlie both of the end-lasting wipers, and a stop carried by the side wiper and arranged to engage the heel wiper thereby to arrest the advancement of the side wiper.

20. In a bed lasting machine, the combination with each of the toe-lasting wipers, of a side-lasting wiper for operating on the ball and shank portions of a shoe in the machine comprising a flexible wiper plate and an inflexible frame to which the plate is secured, and pivotal connections between the side-lasting wiper and the adjacent toe-lasting wiper.

21. In a bed lasting machine, the combination with each of the toe-lasting wipers, of a side-lasting wiper for operating on the ball and shank portions of a shoe in the machine comprising a flexible wiper plate and an inflexible frame to which the plate is secured, and pivotal connections between said frame and the adjacent toe-lasting wiper, said connections being constructed and arranged to permit relative movement of the side wiper and the toe wiper lengthwise of the shoe.

22. In a bed lasting machine, the combination with the toe-lasting wipers and heel-lasting wipers, of a side-lasting wiper for operating on the ball and shank portions of a shoe in the machine comprising a flexible wiper plate and an inflexible frame to which the plate is secured, said side-lasting wipers being supported at their ends by the engagement of the flexible wiper plate with the adjacent toe and heel wipers respectively.

23. In a machine for operating on pre-welted shoes, a lasting wiper for use in lasting the ball and shank portions of a shoe in the machine comprising a thin flexible plate, and an inflexible member which overlies and is rigidly and permanently secured to the flexible plate and is set back from the wiping edge of the flexible plate substantially to the extent of the width of the welt of a pre-welted upper, the portion of said member against which the plate is secured being constructed and arranged to conform generally to the profile of that portion of the shoe on which the wiper operates.

24. In a bed lasting machine, a toe head, toe-lasting wipers mounted therein, side-lasting wipers carried by the toe head, and means for moving the side wipers lengthwise of a shoe in the machine relatively to the toe wipers.

25. In a bed lasting machine, a toe head, toe-lasting wipers mounted therein, side-lasting wipers carried by the toe head, and means actuated by movement of the toe head lengthwise of a shoe in the machine for moving the side wipers lengthwise of the shoe relatively to the toe wipers.

26. In a bed lasting machine, a toe head, side-lasting wipers constructed and arranged to operate on the shank portion of a shoe in the machine, a heel head, and means actuated by movement of the toe head lengthwise of a shoe in the machine for adjusting the side wipers lengthwise of the shoe relatively to the toe head and the heel head.

27. In a bed lasting machine the combination with a toe head of side-lasting wipers constructed and arranged for movement lengthwise of a shoe in the machine by lengthwise movement of the toe head, and means operating against an abutment provided in the machine to determine the ratio of the movement of the side wipers to the movement of the toe head.

28. In a bed lasting machine the combination with a toe head and a heel head, of side-lasting wipers carried by the toe head, and means carried by the toe head and constructed and arranged to operate against the heel head to effect movement of the side wipers toward and from the toe head during lengthwise movement of the toe head.

29. In a bed lasting machine, a toe head, side-lasting wipers, a heel head, and means for effecting adjustive movement of the toe head toward and from the heel head and for simultaneously effecting similar adjustive movement of the side wipers less in extent than the adjustive movement of the toe head, the ratio of the adjustive movement of the side wipers to the adjustive movement of the toe head being variable.

30. In a bed lasting machine, a toe head, a heel head, a side-lasting wiper, a lever constructed and arranged to be actuated by relative movement of the toe head and the heel head toward and from each other, and connections from the lever to the side wiper.

31. In a bed lasting machine, a toe head, a heel head, a side-lasting wiper, a lever constructed and arranged to be actuated by relative movement of the toe head and the heel head toward and from each other, and connections from the lever to the side wiper whereby actuation of the lever moves the side wiper lengthwise of a shoe in the machine relatively to the toe head.

32. In a bed lasting machine, a toe head, a heel head, a side-lasting wiper, and means actuated by relative movement of the toe head and the heel head toward and from each other for effecting adjustment of the side wiper lengthwise of a shoe in the machine, said means comprising a lever carried by one of said heads and having engagement with the other head, and connections from the lever to the side wiper.

33. In a bed lasting machine, a toe head, a slide mounted on the toe head for movement lengthwise of a shoe in the machine, a side-lasting wiper mounted on the slide for movement widthwise of the shoe, and means actuated by movement of the toe head lengthwise of the shoe for moving the slide lengthwise of the shoe relatively to the toe head.

34. In a bed lasting machine, a toe head, a slide mounted on the toe head for movement lengthwise of a shoe in the machine, a side-lasting wiper mounted on the slide for movement widthwise of the shoe, means actuated by movement of the toe head lengthwise of the shoe for moving the slide lengthwise of the shoe relatively to the toe head, said means comprising a lever carried by the toe head and arranged to engage a portion of the machine which remains stationary during the lasting operation, and connections from the lever to the slide.

35. In a machine for use in the manufacture of pre-welted shoes, means for supporting an inverted pre-welted upper by its welt, a clamping member for clamping the welt against the supporting means, a depressor for pressing a last into the upper, and a common actuator for the clamping member and the depressor.

36. In a machine for use in the manufacture of pre-welted shoes, means for supporting an inverted pre-welted upper by its welt, a clamping member for clamping the welt against the supporting means, a depressor for pressing a last into the upper, a common actuator for the clamping means and the depressor, and means for causing the welt-clamping member to lead the depressor during their advancement into operative position.

37. In a machine for use in the manufacture of pre-welted shoes, means for supporting an inverted pre-welted upper by its welt, a clamping member for clamping the welt against the supporting means, and a carrier for the clamping member movable to and from a position wherein the clamping member is arranged to be brought into engagement with the welt.

38. In a machine for use in the manufacture of pre-welted shoes, means for supporting an inverted pre-welted upper by its welt, a clamping member for clamping the welt against the supporting means, a carrier for the clamping member movable to and from a position wherein the clamping member is arranged to be brought into engagement with the welt, yielding means for holding the carrier in a position wherein the clamping member is out of position to engage the welt, and a member constructed and arranged to hold the carrier in a position wherein the clamping member is arranged to engage the welt.

39. In a machine for use in the manufacture of pre-welted shoes, means for supporting a pre-welted upper by its welt, a clamping member for clamping the welt against the supporting means, and a carrier constructed and arranged to carry the clamping member lengthwise of the supported upper to and from a position wherein the clamping member is arranged to be brought into engagement with the welt, said carrier being normally located out of said position.

40. In a machine for use in the manufacture of pre-welted shoes, means for supporting a pre-welted upper by its welt, a clamping member for clamping the welt against the supporting means, a depressor for pressing a last into the clamped upper, and a carrier constructed and arranged to carry the clamping member and the depressor lengthwise of the supported upper to and from a position wherein they are arranged to operate on the work, said carrier being located normally at the end of its movement away from the supported upper.

41. In a machine for use in the manufacture of pre-welted shoes, means for supporting a pre-welted upper by its welt, a clamping member for clamping the welt against the supporting means, a depressor for pressing a last into the clamped upper, a common actuator for the clamping member and the depressor, and a carrier for said member and said depressor constructed and arranged to carry said parts to and from a position wherein they are arranged to operate on the work.

42. In a machine for use in the manufacture of pre-welted shoes, means for supporting an inverted pre-welted upper by its welt, a carrier arranged for movement lengthwise of the supported upper, a clamping member mounted on the carrier for swinging movement about an axis extending transversely of the supported upper, said member being provided with presser feet constructed and arranged to engage the welt of the supported upper, an arm mounted on the carrier for swinging movement about an axis extending transversely of the supported upper, and a depressor carried by said arm and constructed and arranged for movement relatively to said arm to and from a position wherein it is arranged to be brought into engagement with a last arranged to be depressed into the supported upper.

43. In a machine for use in the manufacture of pre-welted shoes, means for supporting an inverted pre-welted upper by its welt, a carrier arranged for movement lengthwise of the supported upper, a clamping member mounted on the carrier for swinging movement about an axis extending transversely of the supported upper, said member being provided with presser feet constructed and arranged to engage the welt of the supported upper, an arm mounted on the carrier for swinging movement about an axis extending transversely of the supported upper, and a depressor carried by said arm and constructed and arranged for movement relatively to said arm to and from a position wherein it is arranged to be brought into engagement with a last arranged to be depressed into the supported upper, and a stop carried by the arm for arresting movement of the depressor relatively to the arm and for locating the depressor in a position wherein it is arranged to be brought into engagement with the last.

44. In a machine for use in the manufacture of pre-welted shoes, means for supporting a pre-welted upper by its welt, a clamp for holding the welt on its support, and means for applying pressure to said clamp, said pressure-applying means being normally inoperative but rendered operative by movement of said clamp toward its welt-engaging position.

45. In a machine for use in the manufacture of pre-welted shoes, means for gripping a pre-welted upper by its welt including a welt-pressing member constructed and arranged to be advanced by hand into welt-engaging position, and treadle-actuated means rendered operative by such advancement of the welt-pressing member and constructed and arranged to apply pressure thereto.

46. In a bed lasting machine, a toe head, toe-lasting wipers, means for clamping against said wipers an outwardly extending flange of a shoe upper, side-lasting wipers, and means actuated by movement of the toe head lengthwise of a shoe in the machine for effecting movement of the side wipers lengthwise of the shoe.

47. In a bed lasting machine, a toe head, toe-lasting wipers, means for clamping against said wipers an outwardly extending flange of a shoe upper, side-lasting wipers, a heel head, means actuated by relative movement of the toe head and the heel head toward and from each other for effecting movement of the side wipers lengthwise of a shoe in the machine, and a presser member for pressing an outsole against the outwardly-extending flange of the upper while the upper is held in lasted position by the wipers.

48. In a bed lasting machine, toe-lasting wipers, side-lasting wipers, a common actuator for the toe wipers and the side wipers, means for clamping against the toe wipers an outwardly-extending flange of a shoe upper, and means for forcing the toe end of a last into the toe end of the upper while the flange of the upper is clamped against the wipers.

49. In a bed lasting machine, toe-lasting wipers, side-lasting wipers, a common actuator for the toe wipers and the side wipers, means for clamping against the toe wipers an outwardly-extending flange of a shoe upper, a depressor for forcing the toe end of a last into the toe end of the upper, and a sole-laying member for pressing a sole against the outwardly-extending flange of the upper while the upper is held in lasted position by the wipers.

50. In a bed lasting machine, toe-lasting wipers, side-lasting wipers, manually-operated means for simultaneously advancing the toe wipers and the side wipers, heel-lasting wipers, means for clamping against the toe wipers an outwardly-extending flange of a shoe upper, means for clamping the heel portion of said flange against the heel wipers, a depressor for pressing a last into the clamper upper, manually-operated means for simultaneously advancing the toe wipers and the side wipers, and a sole-laying member for pressing a sole against the outwardly-extending flange of the upper while the upper is held in lasted position by the wipers.

51. In a machine for operating on pre-welted shoes, means for supporting a pre-welted upper by its welt, a series of fingers constructed and arranged to guide the forepart of the last during its depression into the supported upper, a carrier for said fingers whereby the fingers are movable heightwise of the supported upper to and from operative position, a series of presser feet on the fingers, respectively, said presser feet being arranged to engage the welt of the supported upper thereby to clamp the welt against its supporting means and to arrest the heightwise movement of the finger carrier toward the supported upper, and a depressor for pressing a last into the supported upper to a limit determined by the engagement of the depressor with the finger carrier.

52. In a bed lasting machine, a toe head, toe-lasting wipers and side-lasting wipers carried by the toe head, heel-lasting wipers, and means for effecting relative adjustment of the toe head and the heel-lasting wipers heightwise of a shoe in the machine and for maintaining the adjusted position of said parts during the operation of the machine.

53. In a bed lasting machine, a toe head, toe-lasting wipers and side-lasting wipers carried by the toe head, a column extending downwardly from the toe head and slidably mounted in a guideway in the machine frame, heel-lasting wipers, and manually-operated means constructed and arranged to operate on said column thereby to effect adjustment of the toe head relatively to the heel-lasting wipers heightwise of a shoe in the machine.

RENÉ E. DUPLESSIS.